US010886570B2

(12) United States Patent
Jin et al.

(10) Patent No.: US 10,886,570 B2
(45) Date of Patent: Jan. 5, 2021

(54) SECONDARY BATTERY

(71) Applicant: Ningde Amperex Technology Limited, Fujian (CN)

(72) Inventors: Xin Jin, Fujian (CN); Tao Tao, Fujian (CN); Jie Xi, Fujian (CN)

( * ) Notice: Subject to any disclaimer, the term of this patent is extended or adjusted under 35 U.S.C. 154(b) by 0 days.

(21) Appl. No.: 15/994,190

(22) Filed: May 31, 2018

(65) Prior Publication Data

US 2018/0277902 A1    Sep. 27, 2018

Related U.S. Application Data

(63) Continuation of application No. PCT/CN2016/070298, filed on Jan. 6, 2016.

(51) Int. Cl.
  *H01M 10/0587*    (2010.01)
  *H01M 2/06*       (2006.01)
  (Continued)

(52) U.S. Cl.
  CPC ....... *H01M 10/0587* (2013.01); *H01M 2/021* (2013.01); *H01M 2/0212* (2013.01);
  (Continued)

(58) Field of Classification Search
  None
  See application file for complete search history.

(56) References Cited

U.S. PATENT DOCUMENTS

2005/0014036 A1* 1/2005 Kim ............... H01M 2/08
429/7

2010/0233536 A1* 9/2010 Yang ............... H01M 2/348
429/211

(Continued)

FOREIGN PATENT DOCUMENTS

CN    200997416    12/2007
CN    201466126 U  * 5/2010 ............ H01M 2/06
(Continued)

OTHER PUBLICATIONS

CN-201466126-U English machine translation (Year: 2014).*

*Primary Examiner* — Scott J. Chmielecki
(74) *Attorney, Agent, or Firm* — Morgan, Lewis & Bockius LLP

(57) ABSTRACT

The present invention provides a secondary battery, comprising a winding bare electrode assembly, a battery pouch and a sealing strip. The winding bare electrode assembly comprises an separator and a tab. The sealing strip encloses a part of the tab of the winding bare electrode assembly, is used for hermetically extending the tab of the winding bare electrode assembly out from the battery pouch of the secondary battery, and is provided with a package portion located in a package area of the battery pouch of the secondary battery, and an extension portion disposed in the battery pouch. Wherein a first width of the package portion in the width direction is greater than a second width of the tab, a third width of the extension portion in the width direction is not less than the second width of the tab, and is less than the first width of the package portion, the outer side edge of the extension portion in the width direction is separated from the separator in the width direction, and the lower side edge of the package portion in the length direction is separated from the upper side edge of the separator in the length direction.

21 Claims, 5 Drawing Sheets

(51) Int. Cl.
    *H01M 2/02*         (2006.01)
    *H01M 2/08*         (2006.01)
    *H01M 2/26*         (2006.01)
    *H01M 10/0525*   (2010.01)
    *H01M 10/054*    (2010.01)

(52) U.S. Cl.
    CPC ........... H01M 2/0275 (2013.01); H01M 2/06 (2013.01); H01M 2/08 (2013.01); H01M 2/263 (2013.01); *H01M 10/054* (2013.01); *H01M 10/0525* (2013.01)

(56) References Cited

U.S. PATENT DOCUMENTS

| | | | | |
|---|---|---|---|---|
| 2014/0011060 | A1* | 1/2014 | Yang | H01M 2/1223 |
| | | | | 429/82 |
| 2014/0030560 | A1* | 1/2014 | Lev | B60L 50/66 |
| | | | | 429/72 |
| 2016/0149268 | A1* | 5/2016 | Fan | H01M 2/348 |
| | | | | 429/50 |

FOREIGN PATENT DOCUMENTS

| | | |
|---|---|---|
| CN | 201466126 U | 5/2010 |
| CN | 103490031 A | 1/2014 |

\* cited by examiner

SECONDARY BATTERY

TECHNICAL FIELD

The present invention relates to the field of batteries, in particular to a secondary battery.

BACKGROUND

With reference to FIG. 1, the sealing strip 3 of the secondary battery in the prior art is in a conventional rectangular shape to ensure that the sealing strip can be effectively sealed by the top of the battery pouch 2.

However, if the sealing strip 3 is too close to the separator 11, then the sealing strip and the inner ring of the separator have a great probability to interfere with each other (for example, the interference area S in FIG. 1), which influences the winding of the separator 11 and reduces winding efficiency.

In the prior art, the interference with the separator 11 can be further reduced by reducing the shoulder width of the sealing strip 3, however, the shoulder width of the sealing strip 3 could not be reduced infinitely. The shoulder width 1.0 mm at present is already the limit, and the further less shoulder width will cause the risk of package leakage.

SUMMARY

To solve the problem in the prior art, the object of the present invention is to provide a secondary battery which can safely seal the battery pouch and the winding bare electrode assembly while avoiding the separator and the sealing strip from interfering with each other when the winding bare electrode assembly is wound and formed, thus improving winding efficiency and winding quality.

To achieve the above object, the present invention provides a secondary battery, comprising a winding bare electrode assembly, a battery pouch and a sealing strip.

The winding bare electrode assembly comprises a separator and a tab.

The sealing strip encloses a part of the tab of the winding bare electrode assembly, is used for hermetically extending the tab of the winding bare electrode assembly out from the battery pouch of the secondary battery, and is provided with a package portion located in a package area of the battery pouch of the secondary battery, and an extension portion disposed in the battery pouch.

Wherein a first width of the package portion in the width direction is greater than a second width of the tab, a third width of the extension portion in the width direction is not less than the second width of the tab, and is less than the first width of the package portion, the outer side edge of the extension portion in the width direction is separated from the separator in the width direction, and the lower side edge of the package portion in the length direction is separated from the upper side edge of the separator in the length direction.

The beneficial effects of the present invention are as follows:

In the secondary battery according to the present invention, the first width of the package portion in the width direction is greater than the second width of the tab, the package portion is located in the package area of the battery pouch of the secondary battery, such that the tab of the winding bare electrode assembly hermetically extends out from the battery pouch of the secondary battery, after being packaged, the secondary battery can be avoided from leaking liquid from the position from which the tab extends out of the battery pouch; the extension portion encloses the part inside the battery pouch of the tab of the winding bare electrode assembly, thus preventing the battery from internal short circuit and erosion because the tab is excessively bared; furthermore, the third width of the extension portion in the width direction is not less than the second width of the tab, and is less than the first width of the package portion, the outer side edge of the extension portion in the width direction is ensured to separate from the separator in the width direction, in which way the separator and the outer side edge of the extension portion in the width direction can be prevented from interfering with each other when the winding bare electrode assembly is wound and formed, thus improving the winding efficiency and the winding quality; owing to the reduction of the third width of the extension portion, the width of the secondary battery and the limit separation size of the tab can be improved, thus increasing the diversity of product sizes; the lower side edge of the package portion in the length direction is separated from the upper side edge of the separator in the length direction, such that the interference between the separator and the package portion as well as the battery pouch when the secondary battery is packaged can be avoided, thus improving the sealing effect of the tab package.

DETAILED DESCRIPTION

Figure 1:
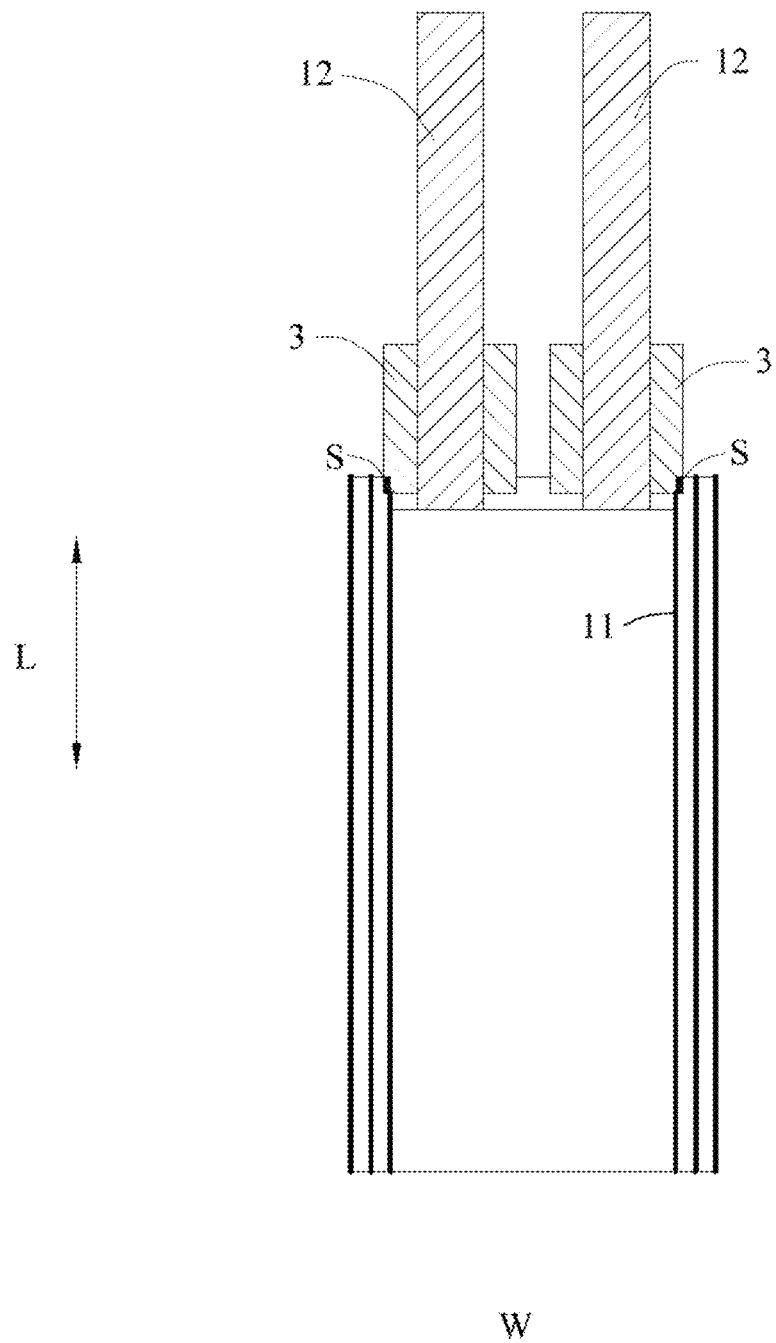
FIG. 1 is a sectional view of the secondary battery in the prior art.
Figure 2:
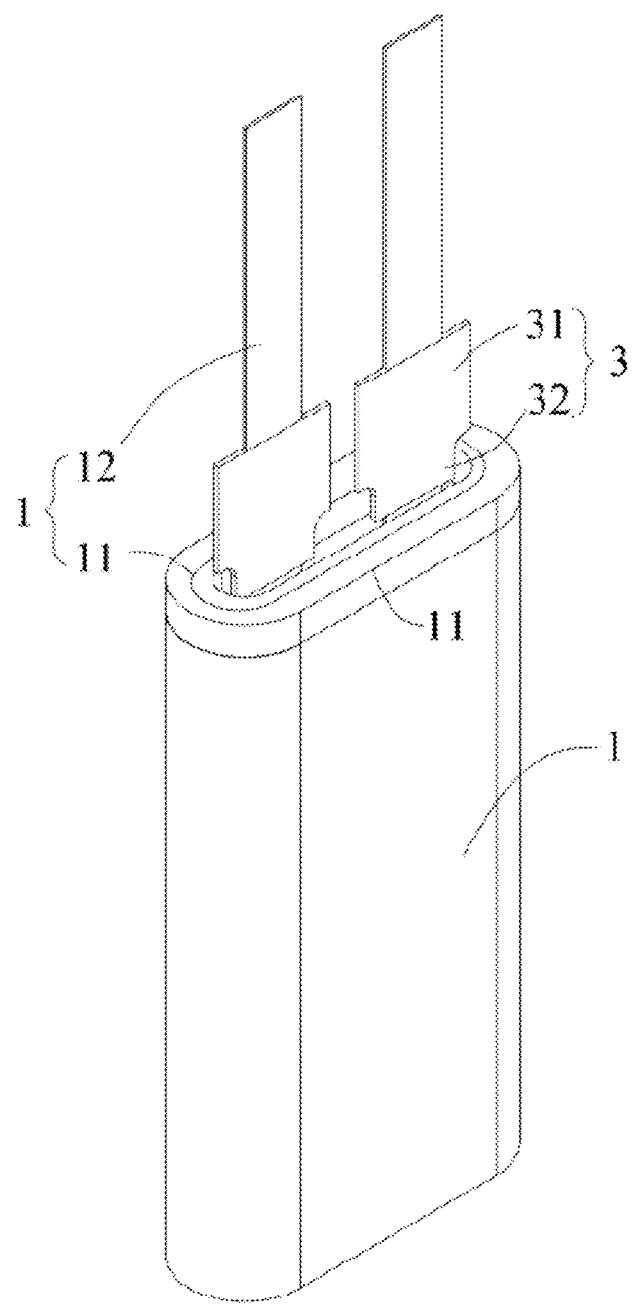
FIG. 2 is a stereoscopic view of the secondary battery according to the present invention, wherein the battery pouch is omitted.

The secondary battery of the present invention will be elaborated hereafter with reference to the drawings.

With reference to FIG. 2-5, the secondary battery according to the present invention comprises a winding bare electrode assembly 1, a battery pouch 2 and a sealing strip 3.

The winding bare electrode assembly 1 comprises a separator 11 and a tab 12.

The sealing strip 3 encloses a part of the tab 12 of the winding bare electrode assembly 1, is used for hermetically extending the tab 12 of the winding bare electrode assembly 1 out from the battery pouch 2 of the secondary battery, and is provided with a package portion 31 located in a package area P of the battery pouch 2 of the secondary battery, and an extension portion 32 disposed in the battery pouch 2.

Wherein a first width W1 of the package portion 31 in the width direction W is greater than a second width W2 of the tab 12, a third width W3 of the extension portion 32 in the width direction W is not less than the second width W2 of the tab 12, and is less than the first width W1 of the package portion 31, the outer side edge of the extension portion 32 in the width direction W is separated from the separator 11 in the width direction W, and the lower side edge of the package portion 31 in the length direction L is separated from the upper side edge of the separator 11 in the length direction L.

In the secondary battery according to the present invention, the first width W1 of the package portion 31 in the width direction W is greater than the second width W2 of the tab 12; the package portion 31 is located in the package area P of the battery pouch 2 of the secondary battery, such that the tab 12 of the winding bare electrode assembly 1 hermetically extends out from the battery pouch 2 of the secondary battery, after being packaged, the secondary battery can be avoided from leaking liquid from the position from which the tab 12 extends out of the battery pouch 2; the extension portion 32 encloses the part inside the battery pouch 2 of the tab 12 of the winding bare electrode assembly 1, thus preventing the battery from internal short circuit and erosion because the tab 12 is excessively bared; furthermore, the third width W3 of the extension portion 32 in the width direction W is not less than the second width W2 of the tab 12, and is less than the first width W1 of the package portion 31, the outer side edge of the extension portion 32 in the width direction W is ensured to separate from the separator 11 in the width direction W, in which way the separator 11 and the outer side edge of the extension portion 32 in the width direction W can be prevented from interfering with each other when the winding bare electrode assembly 1 is wound and formed, thus improving the winding efficiency and the winding quality; owing to the reduction of the third width W3 of the extension portion 32, the width of the secondary battery and the limit separation size of the tab 12 can be improved, thus increasing the diversity of product sizes; the lower side edge of the package portion 31 in the length direction L is separated from the upper side edge of the separator 11 in the length direction L, such that the interference between the separator 11 and the package portion 31 as well as the battery pouch 2 when the secondary battery is packaged can be avoided, thus improving the sealing effect of the tab 12 package.

Figure 4:
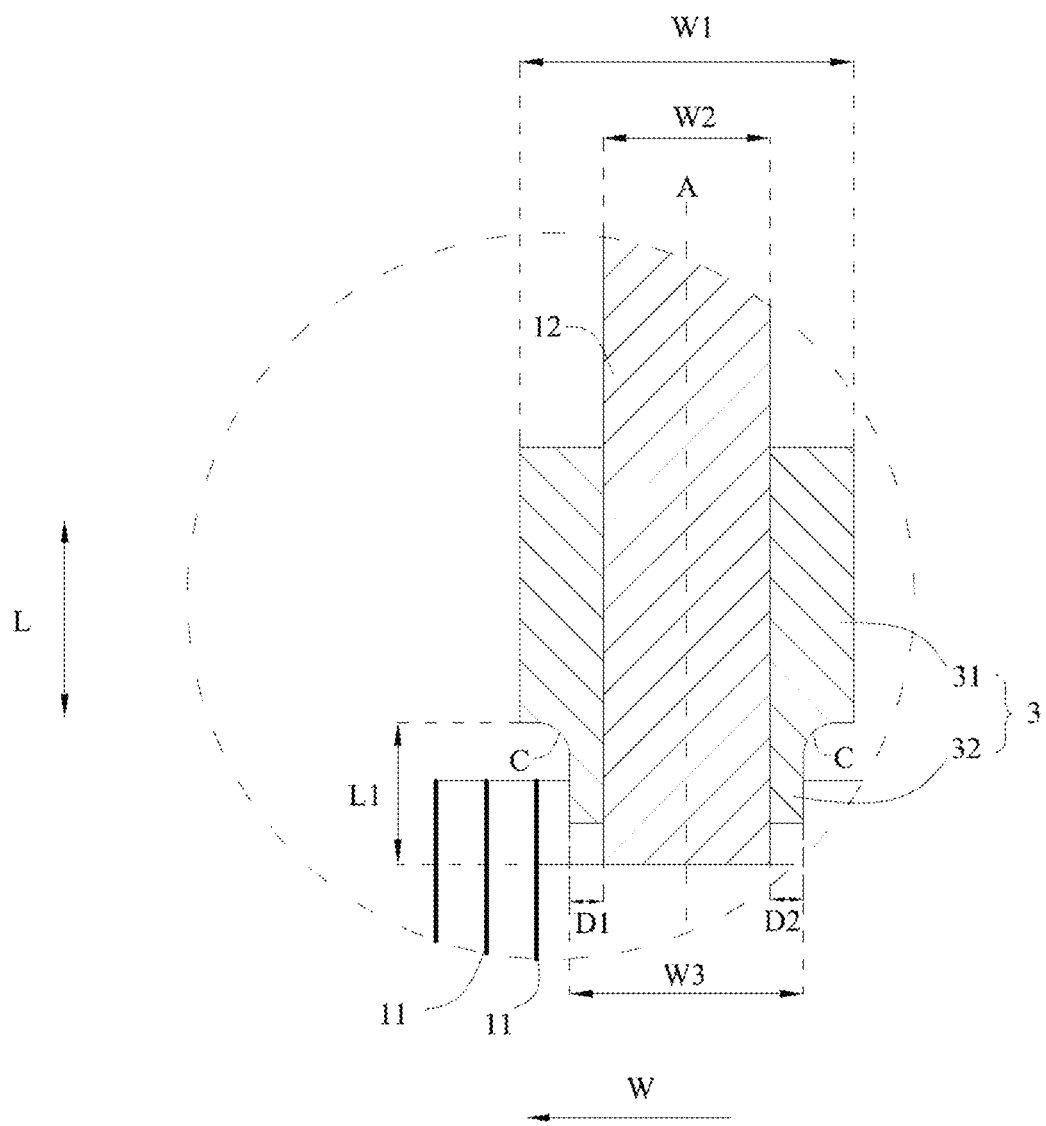
FIG. 4 is an enlarged view of the circle part in FIG. 3.
Figure 5:
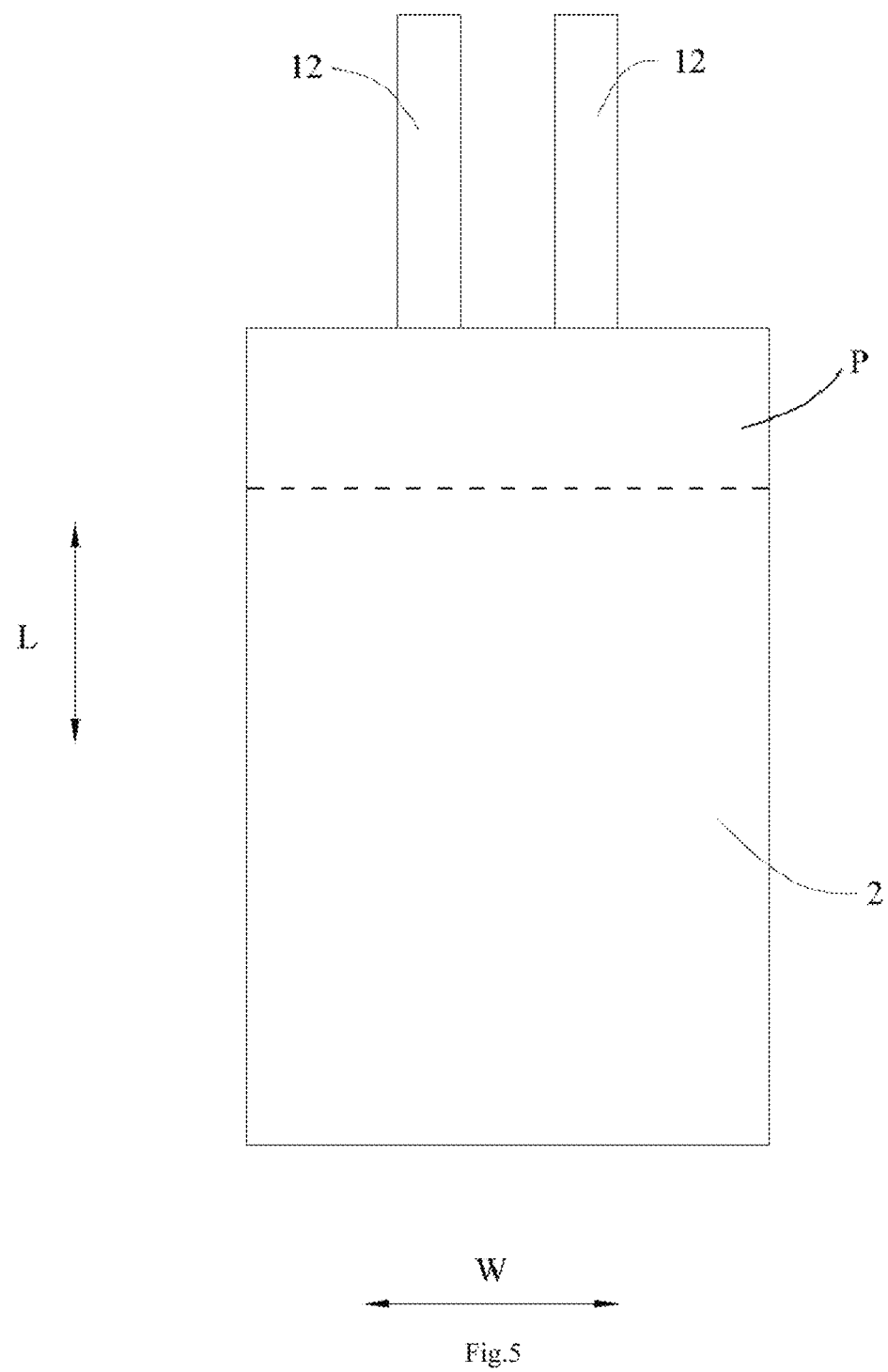
FIG. 5 is a schematic view of the secondary battery according to the present invention.

In the secondary battery according to the present invention, with reference to FIG. 4, in one embodiment, the outer side edge of the extension portion 32 in the width direction W and the outer side edge of the tab 12 in the width direction W are separated by a first distance D1 therebetween, 0 mm≤D1≤10 mm.

In the secondary battery according to the present invention, with reference to FIG. 4, in one embodiment, the inner side edge of the extension portion 32 in the width direction W and the inner side edge of the tab 12 in the width direction W are separated by a second distance D2 therebetween, 0 mm≤D2≤10 mm.

In the secondary battery according to the present invention, with reference to FIG. 4, in one embodiment, a first length of the extension portion 32 in the length direction L is L1, 0.2 mm≤L1<10 mm.

In the secondary battery according to the present invention, with reference to FIG. 4, in one embodiment, a rounded corner C is configured between the outer side edge of the extension portion 32 in the width direction W and the lower side edge of the package portion 31 in the length direction L. In the process or after the sealing strip 3 is formed, a part of material is required to be cut off to form the extension portion 32, the rounded corner C can ensure that the sealing strip 3 does not scratch or tear the separator, and can also ensure that the cut-off part is easy to be removed in the process that the extension portion 32 of the sealing strip is formed.

In the secondary battery according to the present invention, in one embodiment, the radius of the rounded corner C is 0 mm-10 mm.

Figure 3:
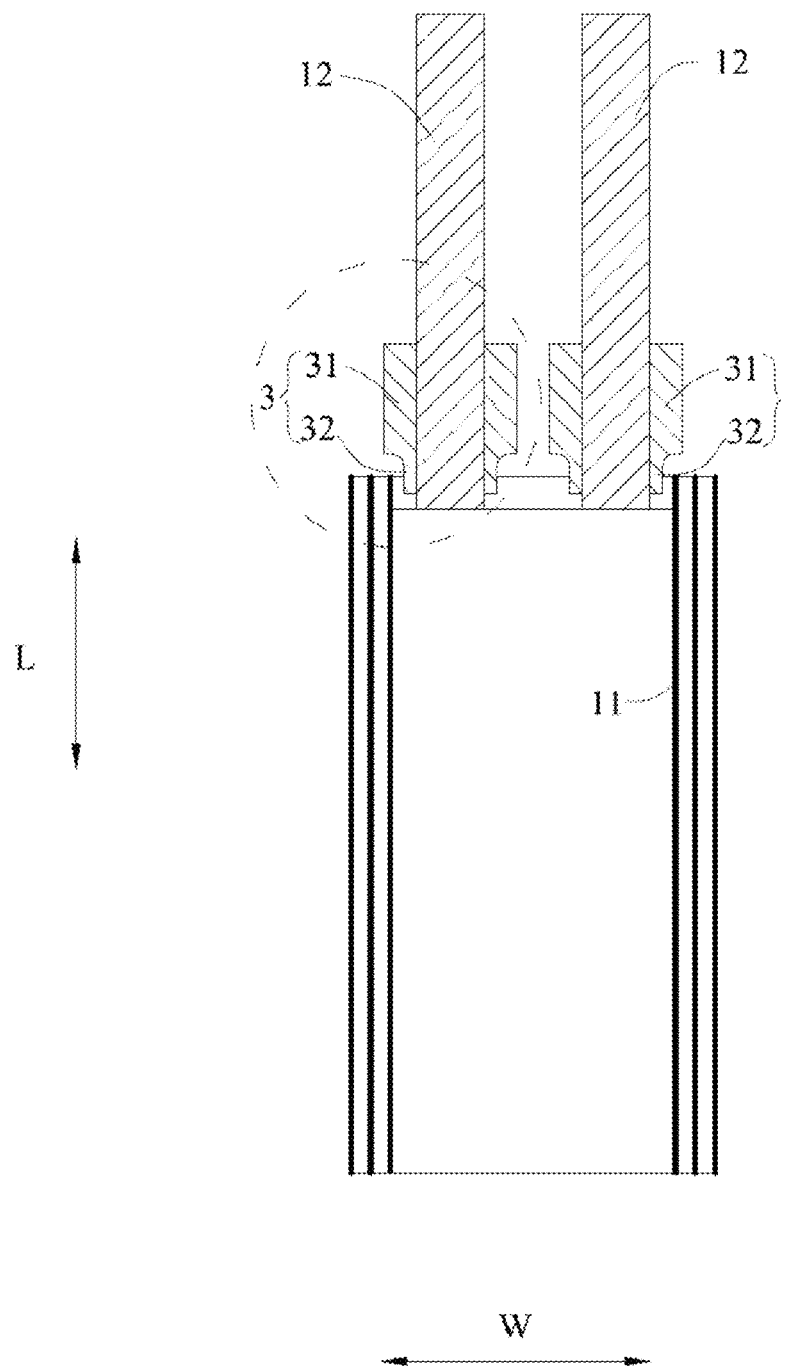
FIG. 3 is a sectional view of the secondary battery according to the present invention, wherein the battery pouch is omitted.

In the secondary battery according to the present invention, with reference to FIGS. 3 and 4, in one embodiment, the lower side edge of the extension portion 32 in the length direction L extends at least to a position from which the tab 12 protrudes out of an electrode plate of the winding bare electrode assembly 1. Extending the lower side edge of the extension portion 32 to the position from which the tab 12 protrudes out of the electrode plate of the winding bare electrode assembly 1, can seal the part of the tab 12 inside the battery pouch 2, thus avoiding the secondary battery from internal short circuit and preventing the tab 12 from being eroded.

In the secondary battery according to the present invention, with reference to FIG. 4, in one embodiment, the sealing strip 3 is left-right symmetric about the axis A of the tab 12 in parallel with the length direction L.

In the secondary battery according to the present invention, in one embodiment, the battery pouch 2 of the secondary battery is a soft battery pouch. The soft battery pouch is made from an aluminum plastic film.

In the secondary battery according to the present invention, in one embodiment, the secondary battery can be a lithium ion battery, a sodium ion battery or a zinc ion battery.

What is claimed is:

1. A secondary battery, comprising:
   an electrode assembly, comprising a separator and a tab;
   a battery pouch, packing the electrode assembly; and
   a sealing strip, disposed on a surface of the tab and comprising:
   a package portion, disposed on a package area of the battery pouch; and
   an extension portion, extending from the package portion along a length direction of the tab, wherein the extension portion is disposed within the battery pouch;
   wherein, in a width direction, the package portion has a first width, the tab has a second width, and the extension portion has a third width;
   the first width is greater than the second width;
   the third width is greater than or equal to the second width;
   the third width is less than the first width;
   the sealing strip is spaced apart from the separator.

2. The secondary battery according to claim 1, wherein, in the width direction, a distance between an outer side edge of the extension portion and an outer side edge of the tab is D1, 0 mm≤D1≤10 mm.

3. The secondary battery according to claim 1, wherein, in the width direction, a distance between an inner side edge of the extension portion and an inner side edge of the tab is D2, 0 mm≤D2≤10 mm.

4. The secondary battery according to claim 1, wherein, in the length direction of the tab, a length of the extension portion is L1, 0.2 mm≤L1<10 mm.

5. The secondary battery according to claim 1, wherein a rounded corner is disposed between an outer side edge of the extension portion and a lower side edge of the package portion.

6. The secondary battery according to claim 4, wherein the rounded corner has a radius of 0 mm-10 mm.

7. The secondary battery according to claim 1, wherein along the length direction of the tab, a lower side edge of the extension portion is connected with an electrode plate of the electrode assembly.

8. The secondary battery according to claim 1, wherein in the length direction of the tab, the sealing strip is symmetrical with respect to an axis of the tab.

9. The secondary battery according to claim 1, wherein the battery pouch is a soft battery pouch.

10. The secondary battery according to claim 1, wherein the secondary battery is a lithium ion battery, a sodium ion battery or a zinc ion battery.

11. A secondary battery, comprising:
an electrode assembly, comprising a separator and a tab;
a battery pouch, packing the electrode assembly; and
a sealing strip, disposed on a surface of the tab and comprising:
   a package portion, disposed on a package area of the battery pouch; and
   an extension portion, extending from the package portion along a length direction the tab, wherein the extension portion is disposed within the battery pouch;
wherein, in a width direction, the package portion has a first width, the tab has a second width, and the extension portion has a third width;
the first width is greater than the second width;
the third width is greater than or equal to the second width;
the third width of is less than the first width;
the sealing strip is spaced apart from the separator,
wherein the separator is disposed in a space defined by an outer side edge of the extension portion and a lower side edge of the package portion.

12. The secondary battery according to claim 11, wherein, in the width direction, a distance between an outer side edge of the extension portion and an outer side edge of the tab is D1, $0 \text{ mm} \leq D1 \leq 10 \text{ mm}$.

13. The secondary battery according to claim 11, wherein, in the width direction, a distance between an inner side edge of the extension portion and an inner side edge of the tab is D2, $0 \text{ mm} \leq D2 \leq 10 \text{ mm}$.

14. The secondary battery according to claim 11, wherein, in the length direction of the tab, a length of the extension portion is L1, $0.2 \text{ mm} \leq L1 < 10 \text{ mm}$.

15. The secondary battery according to claim 11, wherein a rounded corner is disposed between an outer side edge of the extension portion and a lower side edge of the package portion.

16. The secondary battery according to claim 14, wherein the rounded corner has a radius of 0 mm-10 mm.

17. The secondary battery according to claim 11, wherein along the length direction of the tab, a lower side edge of the extension portion is connected with an electrode plate of the electrode assembly.

18. The secondary battery according to claim 11, wherein in the length direction of the tab, the sealing strip is symmetrical with respect to an axis of the tab.

19. The secondary battery according to claim 11, wherein the battery pouch is a soft battery pouch.

20. The secondary battery according to claim 11, wherein the secondary battery is a lithium ion battery, a sodium ion battery or a zinc ion battery.

21. The secondary battery according to claim 1, wherein the extension portion protrudes into a space enclosed by the separator.

* * * * *